United States Patent
Lafoux et al.

(10) Patent No.: US 12,312,824 B2
(45) Date of Patent: May 27, 2025

(54) TENT EQUIPPED WITH A DEPLOYABLE CANOPY

(71) Applicant: DECATHLON, Villeneuve d'Ascq (FR)

(72) Inventors: Benjamin Lafoux, Villeneuve d'Ascq (FR); Emilien Bruneteau, Villeneuve d'Ascq (FR)

(*) Notice: Subject to any disclaimer, the term of this patent is extended or adjusted under 35 U.S.C. 154(b) by 265 days.

(21) Appl. No.: 17/964,936

(22) Filed: Oct. 13, 2022

(65) Prior Publication Data
US 2023/0121447 A1    Apr. 20, 2023

(30) Foreign Application Priority Data
Oct. 15, 2021    (FR) ..................... 21 10967

(51) Int. Cl.
| E04H 15/38 | (2006.01) |
| E04H 15/00 | (2006.01) |
| E04H 15/34 | (2006.01) |
| E04H 15/44 | (2006.01) |
| E04H 15/54 | (2006.01) |

(52) U.S. Cl.
CPC .......... *E04H 15/38* (2013.01); *E04H 15/008* (2013.01); *E04H 15/34* (2013.01); *E04H 15/44* (2013.01); *E04H 15/54* (2013.01)

(58) Field of Classification Search
CPC ....... E04H 15/44; E04H 15/008; E04H 15/34; E04H 15/38
See application file for complete search history.

(56) References Cited

U.S. PATENT DOCUMENTS

| 2,864,388 | A | * | 12/1958 | Oliver | ..................... E04H 15/38 135/117 |
| 2,864,390 | A | * | 12/1958 | Oliver et al. | ........... E04H 15/48 135/136 |
| 7,640,942 | B2 | * | 1/2010 | Chu | ......................... E04H 6/04 135/132 |
| 7,845,364 | B2 | * | 12/2010 | Tolmie | .................... E04H 15/38 135/900 |
| 9,567,767 | B2 | | 2/2017 | Kendrick | |
| 10,543,771 | B2 | * | 1/2020 | Sautter | ...................... B60P 3/34 |
| 10,890,010 | B1 | | 1/2021 | Chang | |
| D998,078 | S | * | 9/2023 | Lafoux | ....................... D21/834 |
| 2020/0048926 | A1 | | 2/2020 | Reeder | |
| 2023/0349189 | A1 | * | 11/2023 | Payne | ...................... B60P 3/38 |

FOREIGN PATENT DOCUMENTS

FR      1190343 A    10/1959

OTHER PUBLICATIONS

Machine translation of FR 1190343.

* cited by examiner

*Primary Examiner* — Noah Chandler Hawk (57) ABSTRACT

A deployable tent including a frame including a first pole, a first and a second base part pivoting between a folded position and an unfolded position, the tent including a first canopy delineated from a canvas body by a connecting line having first and second connecting line portions, the first canopy further including a free distal edge having first and second edge portions, the tent including a first reinforcement configured to pivot into the deployed position when the frame is unfolded, such as to deploy the first canopy.

19 Claims, 6 Drawing Sheets

TENT EQUIPPED WITH A DEPLOYABLE CANOPY

TECHNICAL FIELD

This disclosure relates to the technical field of deployable tents for camping, equipped with a frame and a tent canvas interacting the frame. Such tents are known as deployable since they can take a deployed position allowing them to be used and a folded position in which they can be stored.

This disclosure relates more precisely to tents configured to rest on the ground or to be placed on the roof of a vehicle, and which have a frame including two base parts which can be unfolded, in the manner of a fan, these tents being moreover equipped with at least one canopy to protect the user from the sun or rain.

BACKGROUND

Tents configured to be placed on the roof of a vehicle are known as described in the document U.S. Pat. No. 9,567,767 B2. This tent includes a frame equipped with two base parts and a plurality of poles which can be unfolded like a fan. The tent of this document further includes a tent canvas interacting with the frame and including a canvas body and a canopy connected to the canvas body. To deploy the canopy to protect the user, inserted metal rods are disposed by the user between the canvas body and ends of the canopy.

One drawback of this tent is that the metal rods used to tauten and deploy the canopy must be put in place manually after deploying the tent. It is particularly advisable to insert the ends of the metal rods into eyelets disposed on the canvas body and the canopy. This step of installing a metal rod can be particularly long and arduous and must be repeated many times, according to the number of canopies that must be formed. Furthermore, the installation of the metal rods can prove dangerous insofar as they must be tensioned and risk being projected in the direction of the user if they are incorrectly positioned. Furthermore, if the tent is placed on the roof of a vehicle, these placement steps must be done at height, the user then risking a fall and injury.

The formation of the canopies of this tent according to the disclosure is therefore particularly long and complex and a source of injury to the user.

In addition, when the user wishes to store this tent, the rods must be removed and risk being lost if they are not correctly stored. They also prove particularly cumbersome once the tent has been folded and stored away.

SUMMARY

One aim of this disclosure is to make provision for a deployable tent remedying the aforementioned problems.

To do this, the disclosure relates to a deployable tent including:
  a frame including a first base part and a second base part mounted pivotably with respect to the first base part, about an axis of pivot, between a folded position in which the second base part rests above the first base part, and an unfolded position in which the first and second base parts extend side-by-side in a base plane, in such a way as to form a base for the tent, the frame further including at least a first pole mounted pivotably with respect to at least one of the first and second base parts about a first axis of rotation parallel to the axis of pivot, the first pole being configured to extend transversely to the base plane when the frame is in the unfolded position and to extend between the first base part and the second base part when the frame is in the folded position;
  a tent canvas interacting with the frame including:
    a. a canvas body, including at least a first wall of the tent canvas; and
    b. at least a first canopy delineated from the canvas body by a connecting line extending between a first lateral apex located on a first side of the first wall and a second lateral apex located on a second side of the first wall, opposite the first side, the connecting line including a first connecting line portion extending between a first upper apex of the connecting line and the first lateral apex, and a second connecting line portion extending between the first upper apex and the second lateral apex, the first canopy further including a free distal edge distant from the connecting line and extending between the first and second lateral apices, the free distal edge including a first edge portion extending between a first distal apex of the free distal edge and the first lateral apex and a second edge portion extending between the first distal apex and the second lateral apex, the tent further including at least a first reinforcement extending between the first distal apex and the canvas body, the first reinforcement being furthermore articulated pivotably with respect to the first wall of the tent canvas in at least a first lower part disposed below the first upper apex, such that the first reinforcement extends under the first canopy when the frame is unfolded, the first reinforcement being able to take a deployed position and a folded-down position in which it extends against the canvas body, when the frame is placed in the folded position, in which, when the frame is brought into the unfolded position, the first and second connecting line portions and the first and second edge portions are tensioned and exert a force on the first reinforcement such as to pivot the first reinforcement with respect to the canvas body toward the base plane, from the folded-down position into the deployed position in which it protrudes transversely to the first wall of the tent canvas such as to deploy the first canopy with respect to the canvas body.

Preferably, the tent according to this disclosure is a roof tent, particularly suitable for resting on the roof of a vehicle, such as a car or a van, without damaging it. The tent can also be disposed on the ground, for example outside, and particularly on uneven ground.

The tent extends advantageously along a longitudinal direction and has first and second longitudinal ends.

The first and second base parts are configured to rest on the roof or on the ground. Preferably, the axis of pivot of the second base part with respect to the first base part extends parallel to the surface on which the tent rests, and still preferably horizontally. The base plane extends advantageously horizontally.

Preferably, the first pole is mounted pivotably with respect to the first base part or to the second base part about the axis of pivot of the second base part with respect to the first base part. The first pole is preferably mounted pivotably with respect to the first and second base parts.

Without limitation, the first pole advantageously has a first end mounted pivotably with respect to a first lateral edge of the first or second base part and a second end mounted pivotably with respect to a second lateral edge of the first or second base part, opposite the first lateral edge.

The pivoting of the second base part with respect to the first base part drives the pivoting of the first pole with respect to the first base part or to the second base part, for example taking into consideration the design of the tent canvas interacting with the pole and the base parts.

Advantageously, the frame, including the first and second base parts as well as the at least one first pole, unfolds in the manner of a fan.

The first pole is advantageously "U"-shaped and includes a first lateral part, a second lateral part and a central part connecting the first and second lateral parts.

Preferably, the canvas body and/or the first canopy are soft. They can advantageously be rolled up.

Reciprocally, the canvas body interacts with the frame, and in particular at least the first pole, such that the canvas body is tensioned when the frame is placed in the unfolded position, in such a way as to form an inner volume of the tent in which the user can shelter.

The first wall can be a lateral wall of the tent, i.e. a wall transverse to the axis of pivot of the second base part with respect to the first base part. Alternatively, the first wall can be a front or back wall of the tent, i.e. a wall parallel to the axis of pivot.

The connecting line is formed at the interface between the canvas body and the first canopy. Preferably, the first canopy is connected to the canvas body by the connecting line. Still preferably, but without limitation, the first canopy is connected to the canvas body over the whole length of the connecting line. The connecting line advantageously forms a non-free edge of the first canopy. The connecting line may include several portions and several vertices, where applicable forming an angle with one another. The connecting line can be curved or straight.

The free distal edge of the canopy is advantageously not connected to the canvas body. It may include several portions and several vertices, where applicable forming an angle therebetween. The free distal edge can be curved or straight.

The first upper apex is formed on the connecting line. The first canopy is preferably connected to the canvas body at least at the level of the first upper apex. The first canopy can be disposed above a window or an entrance of the tent.

Advantageously, the first lateral apex extends in proximity to a first lower corner of the first wall of the tent, while the second lateral apex extends in proximity to a second lower corner of the first wall of the tent, opposite the first lower corner.

The first reinforcement is advantageously stiff. Without limitation, it may be a plastic, metallic, wooden or composite material. It may be slightly flexible. The first reinforcement is advantageously attached to the free distal edge of the canopy, at the level of the first distal apex.

When the frame is in the folded position, corresponding to a storage position of the tent, the canvas body and the first canopy extend between the first base part and the second base part. They are not tensioned and are advantageously rolled up. The first reinforcement is in the folded-down position and also extends between the first and second base parts. In the folded-down position, the first reinforcement extends advantageously along the first pole. When the reinforcement is in the folded position, the first reinforcement advantageously does not extend beyond the edges of the first and second base parts.

Owing to the disclosure, when the frame is folded, the first reinforcement can be kept in interaction with the tent canvas, which reduces the risks of losing the first reinforcement. In the folded-down position, the first reinforcement moreover has reduced bulk, limiting the space occupied by the tent once stored. It preferably extends above the first lower part.

Preferably, but without limitation, the first reinforcement is mounted on the first wall of the tent and/or on the free distal edge of the first canopy, detachably. Advantageously, the first reinforcement is disposed in a sheath, for example a fabric sheath. One benefit is to protect the first reinforcement, while reducing the risk of injury to the user.

To deploy the tent, it is advisable to bring the frame into the unfolded position. To do this, the user pivots the second base part with respect to the first base part, about the axis of pivot. This drives the pivoting of the first pole with respect to the first base part or to the second base part, until it extends transversely to the base plane, without the user performing any operation on the first pole.

Preferably, but without limitation, the tent includes a ladder mounted pivotably with respect to the second base part, under the second base part. The ladder allows the user to pivot the second base part with respect to the first base part using the ladder as a lever. By tipping the ladder, the second base part is rotationally driven with respect to the first base part.

In the folded position of the frame, the ladder advantageously rests against the second base part, and more specifically against a lower face of the second base part intended to rest on the ground or the roof of a vehicle.

The ladder is advantageously telescopic.

When the frame is brought from the folded position to the unfolded position, the canvas body interacting with at least the first pole is tensioned such that it forms the at least one first wall and defines the inner volume of the tent. The first lateral apex and the second lateral apex are advantageously separated from one another. Furthermore, the distance separating the first upper apex and the second lateral apex, as well as the distance separating the first upper apex and the second lateral apex, increase. Consequently, the connecting line and therefore the first and second connecting line portions are tensioned and form tension lines for the first canopy. Similarly, the distance separating the first distal apex and the first lateral apex, as well as the distance separating the first distal apex and the second lateral apex increase. The free distal edge, and more precisely the first and second edge portions, are consequently also tensioned and form tension lines for the first canopy.

The first and second connecting line portions and the first and second edge portions, tensioned, then exert a force on the first reinforcement, at the level of the first distal apex. Given this force, the first reinforcement is brought from its folded-down position to its deployed position by pivoting with respect to the canvas body. The first reinforcement is lowered and pivots downward, in the direction of the base plane. Similarly, the first distal apex is brought closer to the base plane.

In this deployed position, the first reinforcement extends transversely to the first wall of the tent and bears on the first wall of the tent. It exerts on the first canopy a force directed toward the outside of the tent which tautens and deploys the canopy. This force is exerted along the direction of the first reinforcement. It moreover makes it possible to keep the first canopy in the deployed position in which it protrudes with respect to the first wall and makes it possible to protect user from the rain or from the sun.

Furthermore, the first distal apex is kept substantially immovable with respect to the canvas body by the first reinforcement. The forces exerted on the first reinforcement by the first and second connecting line portions and the first and second edge portions make it possible to effectively keep the first reinforcement in the deployed position. One benefit is in particular that of keeping the canopy deployed in spite of wind.

Owing to the disclosure, putting the frame in the unfolded position makes it possible to deploy the first canopy without any additional operation of the user. The disclosure makes it possible to dispense with a step of manual placement of the metal rods to support the canopy or canopies, facilitating and thus reducing the installation time of the tent and in particular the forming of the tent canopies. The risks of injury to the user when installing the tent are also reduced.

In the unfolded position of the frame, the first upper apex extends advantageously in a plane including the first wall of the tent. The first lower part extends preferably substantially to the vertical of the first upper apex, under the first upper apex.

When it is deployed, the transverse dimensions of the first canopy considered between the first upper apex and the first distal apex are advantageously smaller than the length of the first canopy considered between the first and second lateral apices, preferably at least twice as small.

When it is mounted on the roof of a vehicle, the tent extends advantageously cantilevered with respect to the roof when it is in the deployed position. Preferably, the ladder then forms a strut for the tent, supporting the second base part.

Advantageously, the first reinforcement extends perpendicularly to the first wall of the tent when it is placed in the deployed position, thanks to which the force exerted by the first canopy on the first reinforcement, as well as the relative force exerted by the first tent wall on the first reinforcement are directed perpendicularly to the first wall of the tent on which the first reinforcement bears. These forces tend to keep the first reinforcement in the deployed position, more effectively preventing it from folding in an untimely manner, for example in the event of wind.

Preferably, the first and second base parts take the form of plates defining a floor for the tent when the frame is in the unfolded position. One benefit is to protect the user from direct contact with the terrain or roof on which the tent is resting. This in particular allows the user to dispose his mattress on an even surface, formed by the base parts. This also reduces the ingress of damp from the surface on which the tent is resting. The comfort of the user is therefore improved.

Advantageously, the axis of pivot of the second base part with respect to the first base part is colinear with the first axis of rotation of the first pole with respect to at least one of the first and second base parts. The frame consequently unfolds in the manner of a fan.

Advantageously, the frame further includes a second pole mounted pivotably with respect to at least one of the first and second base parts about a second axis of rotation parallel to the axis of pivot, the second pole extending between the first pole and the base plane, when the frame is in the unfolded position.

This second pole makes it possible to define a greater inner volume of the tent, improving the comfort of the user. The second pole is advantageously configured to extend transversely to the base plane when the frame is in the unfolded position and to extend between the first base part and the second base part when the frame is in the folded position.

In this unfolded position of the frame, the second pole is preferably inclined with respect to the base plane, preferably by an angle between 15° and 80°. Preferably, the second pole is mounted pivotably with respect to the second base part and is inclined with respect to this second base part when the frame is unfolded.

Preferably, the first reinforcement includes at least one rod extending between the first distal apex of the free distal edge of the first canopy and the first lower part, the rod being articulated pivotably with respect to the canvas body.

The rod includes a first end connected to the first canopy at the level of the first distal apex and a second end articulated with respect to the canvas body at the level of the first lower part. The rod is of constant length. Its length is chosen in such a way as to allow the tensioning of the first canopy when it is in the unfolded position.

Preferably, the first reinforcement extends along the first pole when the frame is in the folded position. One benefit is that of reducing the bulk of the tent once stored. It will be understood that the first reinforcement then no longer protrudes transversely to the first wall.

Advantageously, the first canopy is attached to the canvas body over substantially the whole length of the connecting line, for example by seams. One benefit is that of dispensing with a step of connecting the first canopy to the canvas body, facilitating the installation of the tent. Another benefit is that of avoiding rain from getting in between the first canopy and the first wall of the tent.

Preferably, the first canopy is tensioned between the first upper apex and the at least one first distal apex, when the first reinforcement is brought into the deployed position. In other words, a tension line is formed between the first upper apex and the first distal apex. One benefit is that of more effectively tautening the canopy between these two apices in order to improve the rain run-off over the first canopy. This moreover makes it possible to avoid the first canopy forming a bowl where the rain could accumulate.

According to a particularly advantageous aspect of the disclosure, the first connecting line portion includes a first proximal vertex extending between the first upper apex and a second upper apex, distant from the first upper apex, as well as a second proximal vertex extending between the second upper apex and the first lateral apex, and wherein the first edge portion includes a first distal vertex extending between the first distal apex and a second distal apex of the free distal edge, distant from the first distal apex, and a second distal vertex extending between the second distal apex and the first lateral apex, the tent further including a second reinforcement extending between the second distal apex and the canvas body, the second reinforcement being furthermore articulated pivotably with respect to the first wall of the tent canvas in at least a second lower part disposed below the second upper apex, such that the second reinforcement extends under the first canopy when the frame is unfolded, the second reinforcement being able to take a deployed position and a folded-down position in which it extends against the canvas body, when the frame is placed in the folded position, in which, when the frame is brought into the unfolded position, the first and second proximal vertices of the first connecting line portion and the first and second distal vertices of the first edge portion are tensioned and exert a force on the second reinforcement such as to pivot the second reinforcement with respect to the canvas body toward the base plane from the folded-down position into the deployed position in which it protrudes transversely to the first wall of the tent canvas such as to deploy the first canopy with respect to the canvas body. The second reinforcement exerts an additional force on the first canopy, at the level of the second distal apex, making it possible to more effectively tauten the first canopy in order to improve the shelter formed. The second reinforcement moreover makes it possible to more soundly keep the canopy in the deployed position, in particular in order to resist wind more effectively.

The second reinforcement is advantageously substantially identical to the first reinforcement and pivots similarly with respect to the canvas body when the frame is brought into the unfolded position. The first lower part and the second lower part are distant from one another. The first reinforcement and the second reinforcement extend advantageously parallel with respect to one another when they are in the deployed position. The second reinforcement is advantageously of the same length as the first reinforcement, or slightly shorter.

Without limitation, the tent could include a third reinforcement.

Advantageously, the canvas body includes a main part interacting at least with the first pole in such a way as to form an inner volume of the tent and a roof part, connected to the main part, the first canopy being connected to the roof part. In this non-limiting configuration, the canvas body is therefore in two parts, connected to one another. The roof part forms an over-roof, also called the dual roof, for the tent. One benefit is that of improving the watertightness of the tent while retaining the option to form a canopy. Without limitation, the first canopy and the roof part can form one and the same part.

Preferably, but without limitation, the transverse dimensions of the first canopy, considered between the first upper apex and the first distal apex are greater than the length of the first reinforcement, considered between the first lower part and the first distal apex. The first upper apex, the first lower part and the first distal apex then advantageously define a triangle, preferably a right-angle triangle, the hypothenuse of which is the length between the first upper apex and the first distal apex. This configuration allows better keeping of the first reinforcement in the deployed position and provides better tensioning of the first canopy between the first upper apex and the first distal apex.

According to a first advantageous embodiment, the first wall of the tent canvas is a lateral wall extending transversely with respect to the axis of pivot of the second base part with respect to the first base part. The first wall then extends from a lateral edge of the base. The first canopy then forms a lateral canopy for the tent.

When the frame is folded, the first and second lateral apices are close to one another. When the frame is unfolded, the first and second lateral apices are separated from one another, allowing the tensioning of the connecting line and of the free distal edge and the putting of the first reinforcement in the deployed position.

Preferably, the first reinforcement pivots with respect to the first wall of the tent canvas in a plane containing the first pole. The first reinforcement advantageously pivots about an axis parallel to the base plane.

Advantageously, the first lateral apex and the second lateral apex extend on either side of the first pole.

Preferably, the first lateral apex and the second lateral apex are disposed in proximity to the longitudinal ends of the tent. One benefit is that of increasing the dimensions of the first canopy considered along the longitudinal direction of the tent, in order to offer a larger shelter to the user.

According to a second advantageous embodiment, the first wall of the tent canvas is a front or back wall extending substantially parallel to the axis of pivot of the second base part with respect to the first base part.

The first canopy then forms a back canopy or a front canopy for the tent, for example overlooking an opening forming an entrance of the tent.

Advantageously, the first and second reinforcements form one and the same part. The first and second reinforcements therefore pivot jointly with respect to the tent body and are therefore brought simultaneously into the deployed position or into the folded-down position. One benefit is that of more soundly keeping the canopy in the deployed position.

Preferably, the tent includes a tensioning element including the first and second reinforcements.

Preferably, the first and second reinforcements are interconnected by a connecting portion, the connecting portion interacting with the free distal edge of the first canopy between the first distal apex and the second distal apex. The connecting portion makes it possible to stiffen the free distal edge of the first between the first distal apex and the second distal apex. This makes it possible to avoid it sagging in the event of rain or if a user presses down on it.

Preferably, the first and second reinforcements and the connecting portion form a "U"-shaped tensioning element, the first and second reinforcements forming the branches of the "U" while the connecting portion forms the base of the "U".

Preferably, an opening is made in the first wall of the tent, the first canopy extending above the opening.

Advantageously, the tent further includes at least a second wall which is transverse to the first wall and extends substantially parallel to the axis of pivot of the second base part with respect to the first base part, the tent canvas further including at least a second canopy delineated from the canvas body by a connecting line extending between a first lateral apex located on a first side of the second wall and a second lateral apex located on a second side of the second wall, opposite the first side, the connecting line including a first connecting line portion extending between a first upper apex of the connecting line and the first lateral apex, and a second connecting line portion extending between the first upper apex and the second lateral apex, the second canopy further including a free distal edge distant from the connecting line and extending between the first and second lateral apices, the free distal edge including a first edge portion extending between a first distal apex of the free distal edge and the first lateral apex and a second edge portion extending between the first distal apex and the second lateral apex, the tent further including at least a first secondary reinforcement extending between the first distal apex of the second canopy and the canvas body, the first secondary reinforcement being furthermore articulated pivotably with respect to the second wall of the tent canvas in at least a first lower part disposed below the first upper apex, such that the first secondary reinforcement extends under the second canopy, the first secondary reinforcement being able to take a deployed position and a folded-down position in which it extends against the canvas body, when the frame is placed in the folded position, in which, when the frame is brought into the unfolded position, the first and second connecting line portions and the first and second edge portions of the second canopy are tensioned and exert a force on the first secondary reinforcement such as to make the first secondary reinforcement pivot with respect to the canvas body toward the base plane from the folded-down position into the deployed position in which it protrudes transversely to the second wall of the tent canvas such as to deploy the second canopy with respect to the canvas body.

In this variant, the tent therefore includes two canopies, one extending from the first wall, forming a lateral wall of the tent, while the other extends from the second wall, forming a front or back wall of the tent. The two canopies are deployed when the frame is unfolded.

BRIEF DESCRIPTION OF THE DRAWINGS

The disclosure will be better understood on reading the following description of embodiments of the disclosure given by way of non-limiting examples, with reference to the appended drawings, wherein.

DESCRIPTION OF THE EMBODIMENTS

The disclosure relates to a deployable tent equipped with at least one deployable canopy.

Figure 1:
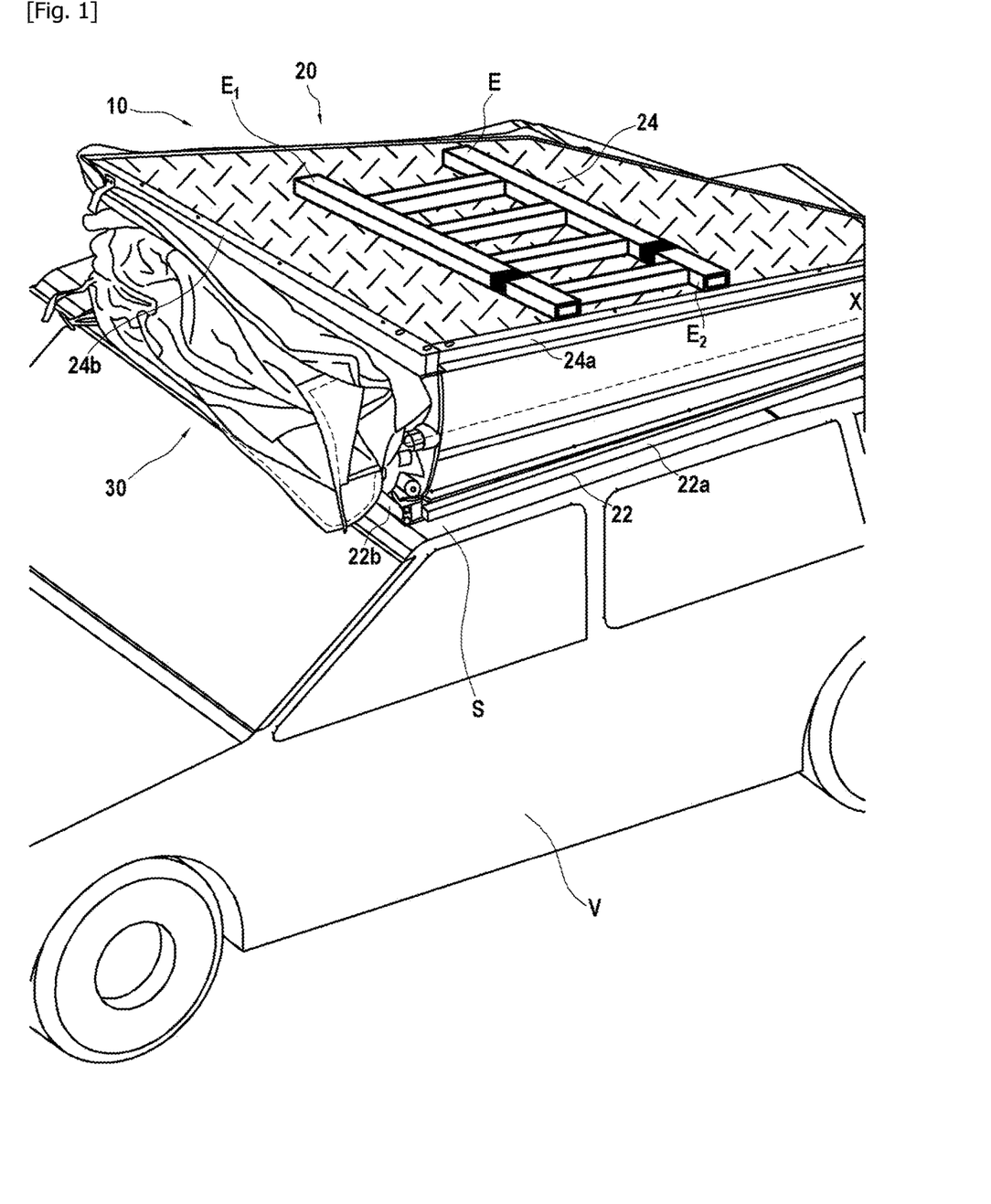
FIG. 1 illustrates a first embodiment of a tent according to the disclosure, the frame being in the folded position.

A first embodiment of a tent according to the disclosure will now be described using FIGS. 1 to 5. FIG. 1 illustrates a first embodiment of a deployable tent 10 according to the disclosure configured to be disposed on a surface S which can be the ground or the roof of a car. In this FIG. 1, the tent is resting on the roof S of a vehicle V, in this case a car, and is in a storage position.

According to the disclosure, the tent 10 includes a frame 20 and a tent canvas 30 configured to interact with the frame. In this non-limiting example, the frame includes a first base part 22 and a second base part 24 mounted pivotably with respect to the first base part about an axis of pivot X.

The first and second base parts 22,24 take the form of a stiff plate and are substantially identical. The second base part has a front edge 24a, mounted pivotably with respect to a front edge 22a of the first base part 22. When the tent 10 is resting on the roof S, the axis of pivot X extends horizontally, parallel to the roof.

Figure 3:
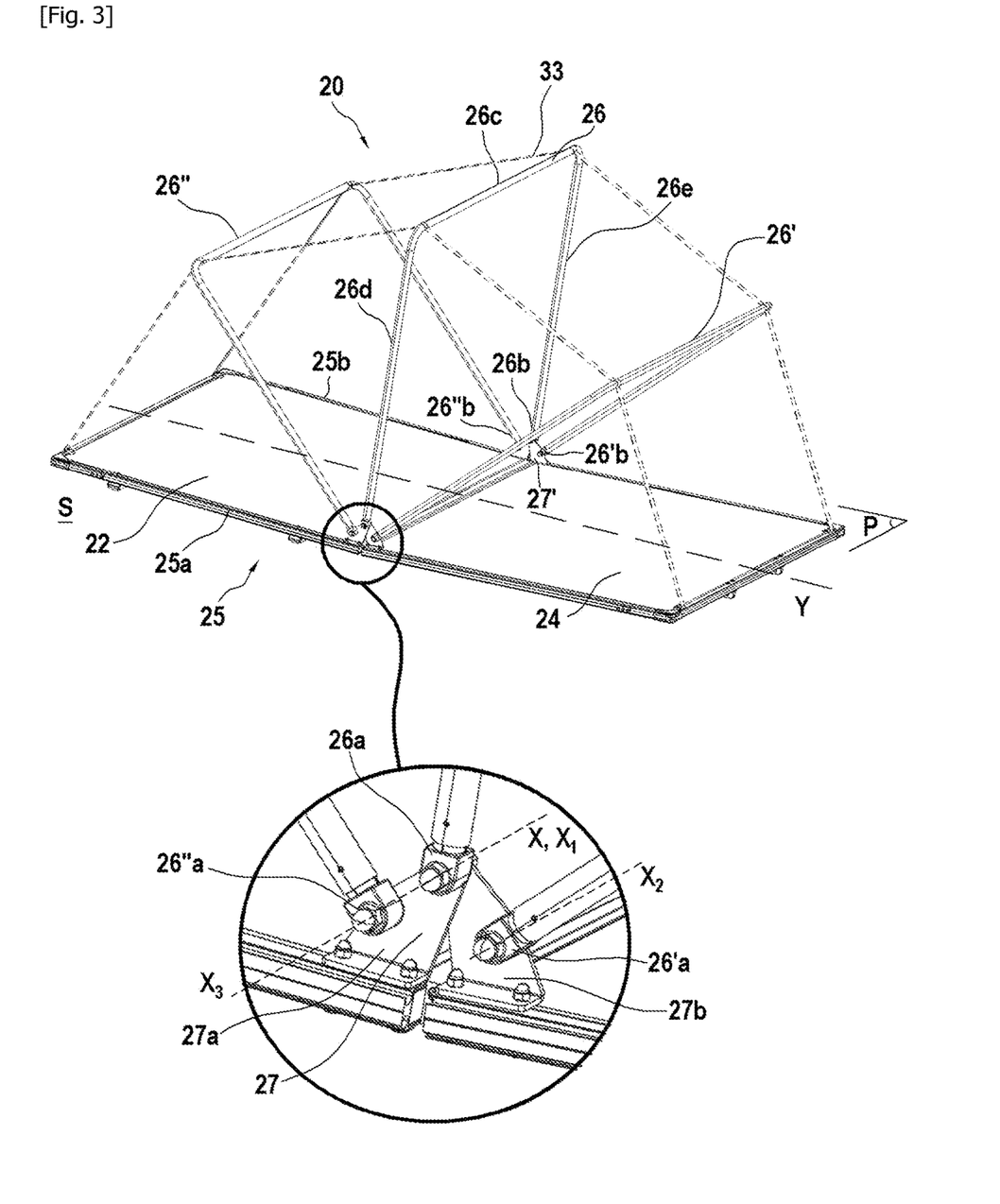
FIG. 3 illustrates the frame of the tent of FIG. 1, in the unfolded position.

The frame moreover includes a first pole 26, a second pole 26' and a third pole 26", visible in FIG. 3, each being mounted pivotably with respect to one of the first and second base parts 22,24.

The tent canvas 30 interacts with the frame 20 and is attached to the first and second base parts 22,24.

In this non-limiting example, the tent is moreover equipped with a telescopic ladder E having a first end $E_1$ mounted pivotably under the second base part 24. The ladder moreover includes a second end $E_2$ forming a free end of the ladder.

When the tent 10 is in the storage position, illustrated in FIG. 1, the frame 20 is in the folded position. The second base part 24 rests above the first base part 22, substantially parallel to the first base part. The tent canvas 30 is not tensioned and extends between the first and second base parts 22,24. Similarly, the first, second and third poles 26,26',26" extend between the first and second base parts, against one another and parallel to one another. The ladder E moreover extends against the second base part 24 and is in the retracted position, such that it has a reduced length.

Figure 2:
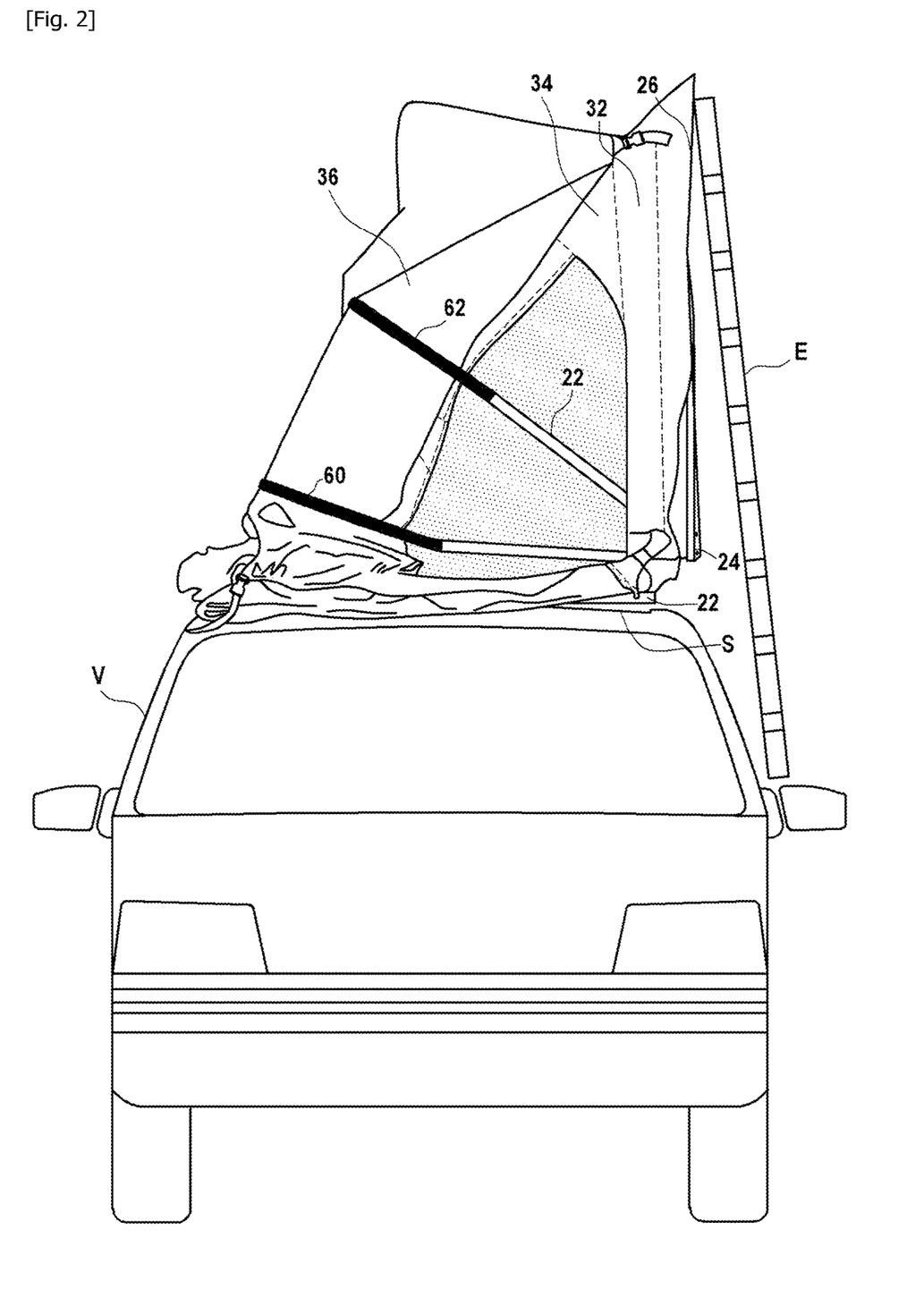
FIG. 2 illustrates the tent of FIG. 1, the frame being in the process of unfolding.

To place the tent in the use position, the user unfolds the frame 20 by pivoting the second base part 24 with respect to the first base part 22, about the axis of pivot X, as illustrated in FIG. 2. In this non-limiting example, the user first deploys the telescopic ladder E to increase its length, the ladder then extending horizontally and cantilevered with respect to the roof of the vehicle. The user then pulls on the free end $E_2$ of the ladder, in the direction of the ground on which the vehicle V is resting, to tip the ladder into a substantially vertical position. The ladder then plays the role of a lever and drives the pivoting of the second base part 24 with respect to the first base part 22, as can be seen in FIG. 2.

The ladder is then pulled until its free end $E_2$ is resting on the ground. The second base part 24 is pivoted until it extends adjacently to the first base part 22, as can be seen in FIG. 3 and in FIG. 4.

FIG. 3 illustrates the frame 20 of the tent 10 in the unfolded position. The tent canvas 30 is not shown to allow the frame 20 to be seen more clearly. In this unfolded position, the first and second base parts 22,24 extend side-by-side in a same base plane P such as to form a base 25 and a floor for the tent. The tent 10 then extends along a longitudinal direction Y.

In this FIG. 3, it can be seen that the frame includes a first plate 27 mounted at a first longitudinal edge 25a of the base. The first plate 27 includes a first plate part 27a secured to the first base part 22 and a second plate part 27b secured to the second base part 24. The second plate part 27b is mounted pivotably with respect to the first plate part 27a about the axis of pivot X. The frame further includes a second plate 27' mounted at a second longitudinal edge 25b of the base 25. The second plate 27' also includes a first plate part and a second plate part mounted pivotably with respect to the first plate part about the axis of pivot X. The first and second plates 27,27' allow the pivotable mounting of the second base part 24 with respect to the first base part 22.

The first, second and third poles 26,26',26" are identical. Each of the poles 26,26',26" extends between the first lateral edge 25a and the second lateral edge 25b of the base 25. The poles are "U"-shaped and each include a first end 26a,26'a, 26"a mounted pivotably with respect to the first lateral edge 25a of the base 25, as well as a second end 26b,26'b,26"b, opposite the first end, mounted pivotably with respect to the second lateral edge 25b of the base. They moreover each include a first lateral part 26d, a second lateral part 26e and a central part 26c connecting the first and second lateral parts.

The first pole 26 is mounted pivotably with respect to the first and second base parts 22,24 about a first axis of rotation $X_1$ colinear with the axis of pivot X. More precisely the first end 26a of the first pole 26 is mounted pivotably on the first and second parts 27a,27b of the first plate 27 and the second end 26b of the first pole 26 is mounted pivotably on the first and second parts of the second plate 27' along the first axis of rotation $X_1$.

The second pole 26' is mounted pivotably with respect to the second base part 24 about a second axis of rotation $X_2$ parallel to the axis of pivot X. More precisely, the first end 26'a of the second pole 26' is mounted pivotably with respect to the second part 27b of the first plate 27 and the second end 26'b of the second pole 26' is mounted pivotably with respect to the second part of the second plate 27' along the second axis of rotation $X_2$.

The third pole 26" is mounted pivotably with respect to the first base part about a third axis of rotation $X_3$ parallel to the axis of pivot X. More precisely, the first end 26"a of the third pole 26" is mounted pivotably with respect to the first part 27a of the first plate 27 and the second end 26"b of the third pole 26" is mounted pivotably with respect to the first part of the second plate 27', along the third axis of rotation $X_3$.

Figure 4:
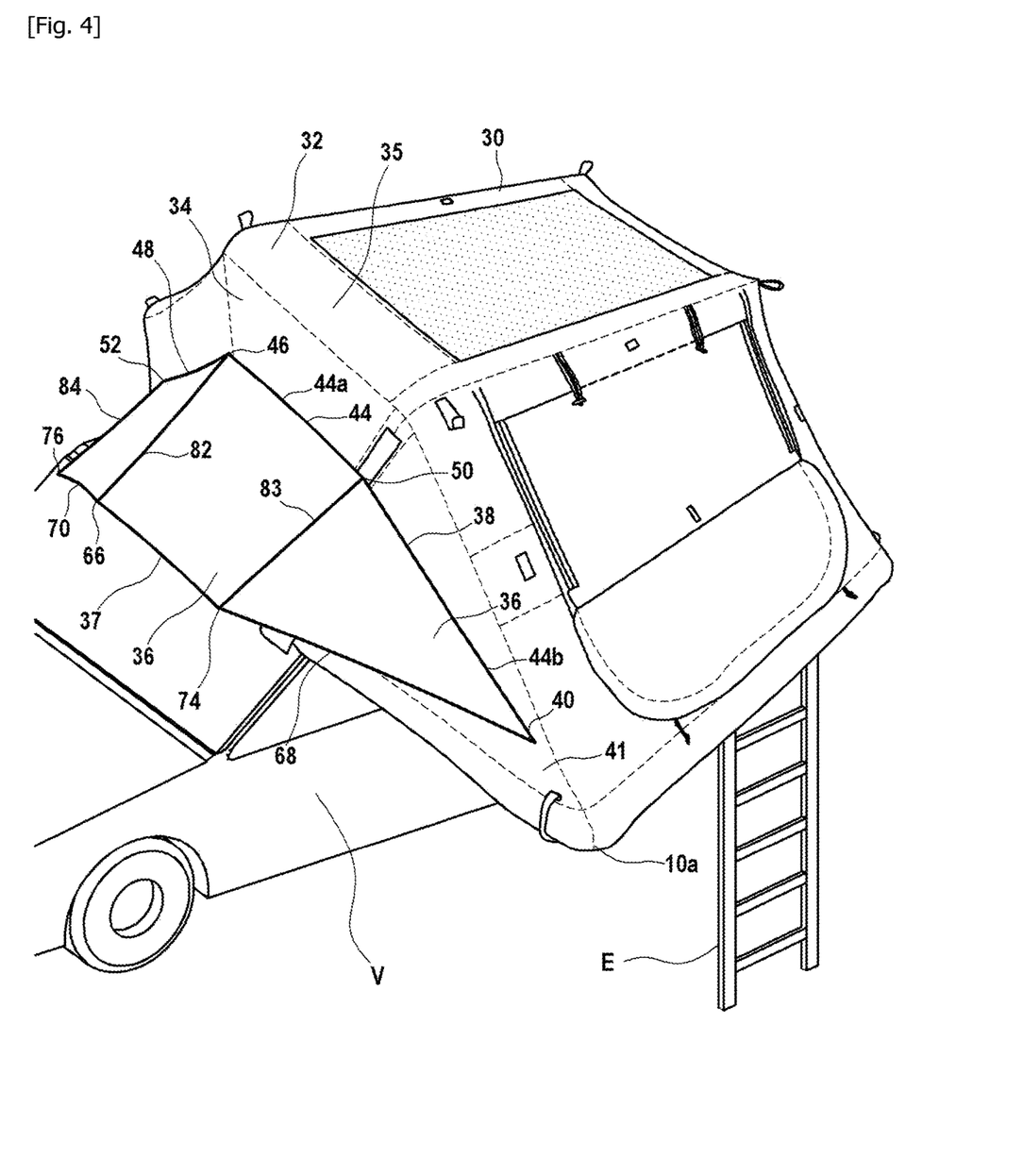
FIG. 4 illustrates the tent of FIG. 1, the frame being in the unfolded position.

As illustrated in FIG. 4, when the frame 20 is unfolded, the tent extends cantilevered from the roof S of the vehicle V, such that only the first base part 22 is resting on the roof, while the second base part 24 is not resting on the roof. The ladder E then rests on the ground and forms a strut configured to support the second base part and therefore, in part, the tent.

As can also be seen in FIG. 4, the tent canvas 30 includes a canvas body 32 which interacts with the frame 20. More precisely, the canvas body 32 includes a main part 35 attached to the first base part 22 and to the second base part 24, and is connected to the first 26, second 26' and third 26" poles.

When the frame 20 is brought from the folded position to the unfolded position by pivoting the second base part 24 with respect to the first base part 22, the canvas body 32 is tensioned, by its interaction with the poles and with the base parts. Consequently, tension lines 33 are formed on the canvas body 32, respectively between the second base part 24 and the second pole 26', between the second pole 26' and the first pole 26, between the first pole 26 and the third pole 26", as well as between the third pole 26" and the first base part 22. These tension lines are illustrated in dotted lines in FIG. 3. These tension lines cause the pivoting of the first, second and third poles about the axis of pivot X, until they each extend transversely to the base and to the base plane P.

In this non-limiting example, in the unfolded position of the frame 20, the first pole 26 extends substantially perpendicularly to the base plane P, in a substantially vertical plane. In this unfolded position, the second pole 26' extends between the first pole 26 and the base plane P, and more precisely between the first pole and the second base part 24. Similarly, in this unfolded position, the third pole 26" extends between the first pole 26 and the base plane P, and more precisely between the first pole and the first base part 22. In this non-limiting example, the angle between the first pole 26 and the second pole 26' and the angle between the first pole 26 and the third pole 26" is approximately equal to 45°. Furthermore, in this unfolded position of the frame, the second pole 26' is inclined with respect to the second base part 24, without limitation by an angle approximately equal to 45°. Similarly the third pole 26" is inclined with respect to the first base part 22, without limitation by an angle approximately equal to 45°.

When the frame 20 is in the unfolded position, the canvas body 32, and particularly the main part 35, interacts with the frame 20 and particularly with the poles in such a way as to be tensioned and define an inner volume of the tent.

In this first embodiment, and as illustrated in FIG. 4, the canvas body 32 includes a first wall 34 forming a side wall of the tent 10. This first wall 34 extends substantially vertically and perpendicularly to the axis of pivot X. The tent canvas 30 further includes a first canopy 36 which is delineated from the canvas body 32 by a connecting line 38 extending between a first lateral apex 40 and a second lateral apex 42.

In this non-limiting example, the first canopy 36 is attached to the canvas body 32 and to the first wall 34 over the whole length of the connecting line 38 by means of a continuous seam, from the first lateral apex 40 all the way to the second lateral apex 42. The first lateral apex 40 is located on a first side 41 of the first wall 34 while the second lateral apex 42 is located on a second side 43 of the first wall, opposite the first side 41. In this non-limiting example, the first and second lateral apices 40,42 extend on either side of the first pole 26. Furthermore, the first lateral apex 40 is disposed in proximity to a first longitudinal end 10a of the tent 10 while the second lateral apex 42 is disposed in proximity to a second longitudinal end 10b of the tent.

The connecting line 38 includes a first connecting line portion 44 extending between a first upper apex 46 of the connecting line, and the first lateral apex 40. The connecting line 38 further includes a second connecting line portion 48 extending between the first upper apex 46 and the second lateral apex 42.

The first connecting line portion 44 includes a first proximal vertex 44a extending between the first upper apex 46 and a second upper apex 50, as well as a second proximal vertex 44b extending between the second upper apex 50 and the first lateral apex 40. The second upper apex 50 is formed on the connecting line 38 and is distant from the first upper apex 46. It extends on the first side 41 of the first wall 34, slightly lower than the first upper apex 46. It extends substantially facing the second pole 26'.

Figure 5:
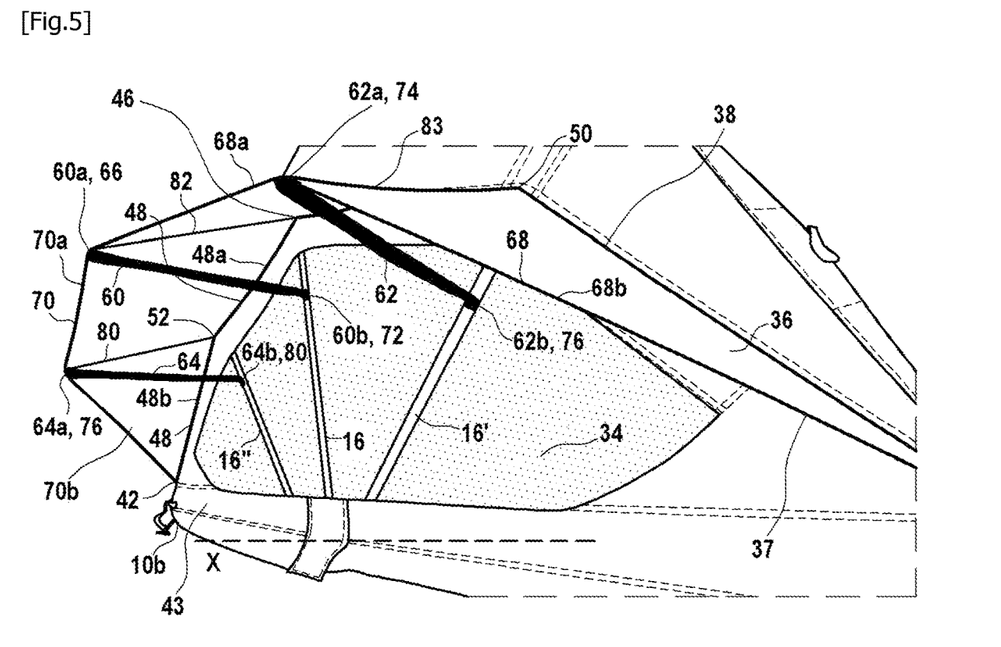
FIG. 5 illustrates the tent of FIG. 4, from another viewing angle.

Moreover, as illustrated in FIG. 5, the second connecting line portion 48 includes a first proximal vertex 48a extending between the first upper apex 46 and a third upper apex 52, as well as a second proximal vertex 48b extending between the third upper apex 52 and the second lateral apex 42. The third upper apex 52 is distant from the first and second upper apices 46,50 and extends on the second side 43 of the first wall 34, slightly lower than the first upper apex 46. It extends substantially facing the third pole 26".

In addition, the first canopy 36 includes a free distal edge 37 distant from the connecting line 38 and from the canvas body 32. The free distal edge 37 extends between the first and second lateral apices 40,42. The free distal edge 37 includes a first edge portion 68 extending between a first distal apex 66 of the free distal edge and the first lateral apex 40. It further includes a second edge portion 70 extending between the first distal apex 66 and the second lateral apex 42. The first and second edge portions are particularly visible in FIG. 5.

The first edge portion 68 moreover includes a first distal vertex 68a extending between the first distal apex 66 and a second distal apex 74 of the free distal edge 37, distant from the first distal apex 66. The first edge portion also includes a second distal apex 68b extending between the second distal apex 74 and the first lateral apex 40. The first distal apex 66 is disposed facing the first upper apex 46. The second distal apex 74 is disposed facing the second upper apex 50.

The second edge portion 70 moreover includes a first distal vertex 70a extending between the first distal apex 66 and a third distal apex 76 of the free distal edge 37, distant from the first distal apex 66. The third distal apex 76 and the second distal apex 74 extend on either side of the first distal apex 66. The second edge portion 70 also includes a second distal vertex 70b extending between the third distal apex 76 and the second lateral apex 42.

According to the disclosure, the tent 10 includes a first reinforcement 60 including, in this non-limiting example, a first rod 60. In this non-limiting example, the frame further includes a second reinforcement 62 including a second rod 62 and a third reinforcement 64 including a third rod 64. The reinforcements 60,62,64 are stiff and of constant length.

Without limitation, they are moreover substantially identical and of the same length. Without departing from the scope of the disclosure, the second and third reinforcements could be slightly shorter than the first reinforcement. In this non-limiting example, the reinforcements are placed in a fabric sheath.

The first reinforcement 60 extends between the first distal apex 66 and the canvas body 32, and more precisely, in this non-limiting example, between the first distal apex and the first wall 34. The first reinforcement 60 includes a first end 60a attached to the first distal apex 66 of the free distal edge 37 of the first canopy 36. The first rod 60 further includes a second end 60b articulated pivotably to the first wall 34 of the tent canvas 30 facing the first pole 26, in a first lower part 72. The first lower part 72 is disposed below the first upper apex 46.

Similarly, the second reinforcement 62 extends between the second distal apex 74 and the canvas body 32, and more precisely, in this non-limiting example, between the second distal apex and the first wall 34. The second reinforcement 62 includes a first end 62a attached to the second distal apex 74 of the free distal edge 37 of the first canopy 36. The second reinforcement 62 further includes a second end 62b articulated pivotably to the first wall 34 of the tent 10 facing the second pole 26', in a second lower part 76. The second lower part 76 is disposed below the second upper apex 50.

The third reinforcement 64 extends between the third distal apex 76 and the canvas body 32, and more precisely, in this non-limiting example, between the third distal apex and the first wall 34. The third reinforcement 64 includes a first end 64a attached to the third distal apex 76 of the free distal edge 37 of the first canopy 36. The third reinforcement 64 further includes a second end 64b articulated pivotably to the first wall 34 of the tent 10 facing the third pole 26", in a third lower part 80. The third lower part 80 is disposed below the third upper apex 52.

The first, second and third reinforcements 60,62,64 extend under the first canopy 36 when the reinforcement 20 is in the unfolded position. The first 60, second 62 and third 64 reinforcements pivot with respect to the first wall 34 in a plane containing the first 26, second 26' and third 26" poles respectively. In this non-limiting example, the first, second and third reinforcements 60,62,64 are mounted detachably on the first wall 34 and on the first canopy 36.

Considered in a plane perpendicular to the axis of pivot X, the axis of pivot X, the first lower part 72 and the first upper apex 46 are aligned. Similarly, considered in the plane, the axis of pivot X, the second lower part 76 and the second upper apex 50 are aligned and the axis of pivot X, the third lower part 80 and the third upper apex 52 are aligned.

In the folded position of the frame 20, illustrated in FIG. 1, and as can be seen in the intermediate position of FIG. 2, the first, second and third reinforcements 60,62,64 are in the folded-down position and extend along the canvas body 32. The canvas body 32 being partly transparent, it can also be seen on FIG. 2 that the first, second and third reinforcements 60,62,64 extend along the first, second and third poles 26,26',26" respectively, although the canvas body separates them.

When the user pivots the second base part 24 in such a way as to bring the frame 20 into the unfolded position, as illustrated by the transition from FIG. 1 to FIG. 3, via the intermediate position of FIG. 2, the canvas body 32 is tensioned and the distance between the first and second lateral apices 40,42 increases. Consequently, the first and second connecting line portions 44,48 as well as the first and second edge portions 68,70 are tensioned. More precisely, the first 44a,48a and second 44b,48b proximal vertices of the first and second connecting line portions 44,48, as well as the first 68a,70a and second 68b,70b distal vertices of the first and second edge portions 68,70 are tensioned and define tension lines. These tension lines can be straight or curved.

The first and second connecting line portions 44,48 as well as the first and second edge portions 68,70, when tensioned, exert an effort on the first end 60a of the first reinforcement 60. The first reinforcement 60 then pivots with respect to the canvas body 32 toward the base plane P, from the folded-down position of FIGS. 1 and 2 into the deployed position of FIG. 3. In the deployed position, the first reinforcement 60 protrudes transversely to the first wall 34 of the tent canvas.

Similarly, the first and second proximal vertices 44a,44b of the first connecting line portion 44 as well as the first and second distal vertices 68a,68b of the first edge portion 68, when tensioned, exert a force on the first end 62a of the second reinforcement 62. The second reinforcement 62 pivots with respect to the canvas body 32 toward the base plane P, from the folded-down position into the deployed position in which it protrudes transversely to the first wall 34 of the tent canvas. The first and second proximal vertices 48a,48b of the second connecting line portion 48 as well as the first and second distal vertices 70a,70b of the second edge portion 70, when tensioned, exert a force on the first end 64a of the third reinforcement 64. The third reinforcement 64 pivots with respect to the canvas body 32 toward the base plane P, from the folded-down position into the deployed position in which it protrudes transversely to the first wall 34 of the tent canvas.

Without limitation, the first, second and third reinforcements 60,62,64 pivot substantially simultaneously toward the deployed position.

In this non-limiting example, in the deployed position, the first, second and third reinforcements 60,62,64 extend perpendicularly to the first wall 34 of the tent 30. Each of these reinforcements bears on the first wall 34 of the tent and exerts a force on the first canopy 36, at the level of the first 66, second 74 and third 76 distal apices, respectively. These forces are directed along the reinforcements, perpendicularly to the first wall 34 and oriented toward the outside of the inner volume of the tent. These forces exerted by the first, second and third reinforcements make it possible to raise the first canopy 36 and to deploy it. The first canopy 36, when deployed, extends in protrusion from the first wall 34. The first canopy 36 is moreover tensioned, particularly between the first upper apex 46 and the first distal apex 66, between the second upper apex 50 and the second distal apex 74 and between the third upper apex 52 and the first distal apex 76 where three tension lines 82,83,84 are formed respectively.

The first canopy 36 is therefore automatically deployed when the frame 20 is unfolded, without the user needing to install or manually unfold the reinforcements.

In the deployed position, the first, second and third reinforcements are kept substantially immovable with respect to the canvas body, taking into account the relative forces exerted by the first canopy 36 and the canvas body 32 on the reinforcements. The first canopy is therefore kept in the deployed position in an effective way.

When the user wishes to store the tent, he lifts the ladder E in such a way as to pivot the second base part 24 toward the first base part 22 in such a way as to bring the frame 20 into the folded position. The first, second and third poles 26,26',26" then pivot toward the first base part 22 until they extend against the first base part. The first and second connecting line portions and the first and second edge line portions are then no longer tautened such that the first, second and third reinforcements 60,62,64 pivot with respect to the first wall 34 and are brought into the folded-down position, corresponding to a neutral position, in which they extend along the poles and along the canvas body 32. The first canopy is therefore also folded down, automatically and without the direct intervention of the user, and extends along the canvas body.

Figure 6:
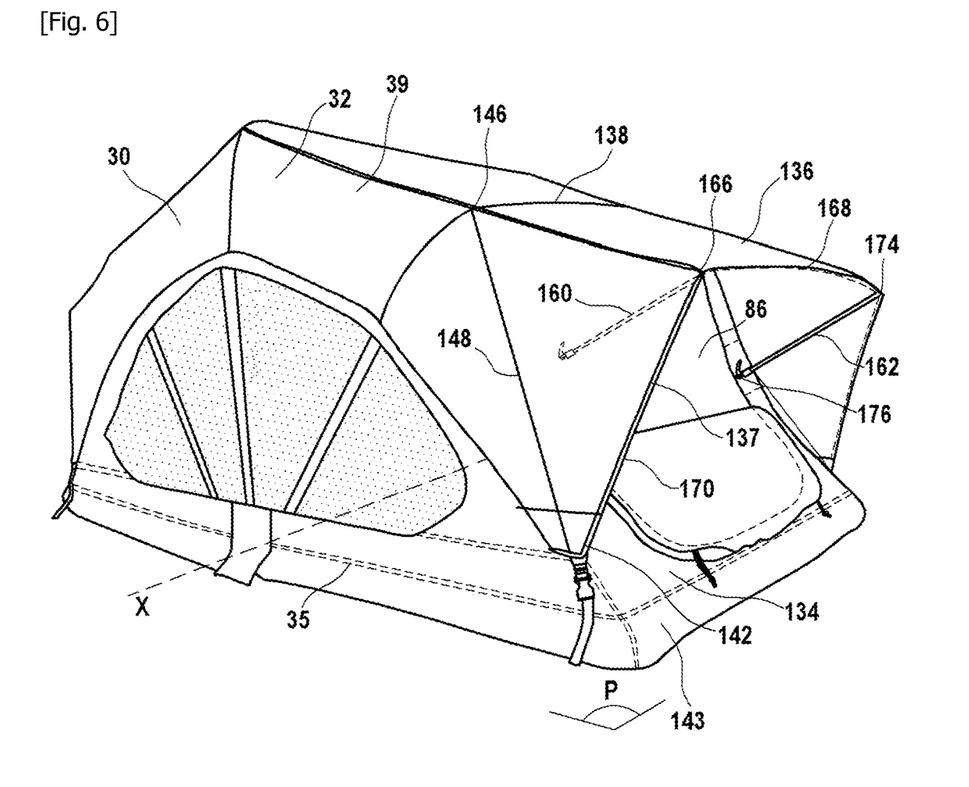
FIG. 6 illustrates a second embodiment of a tent according to the disclosure, the frame being in the unfolded position.
Figure 7:
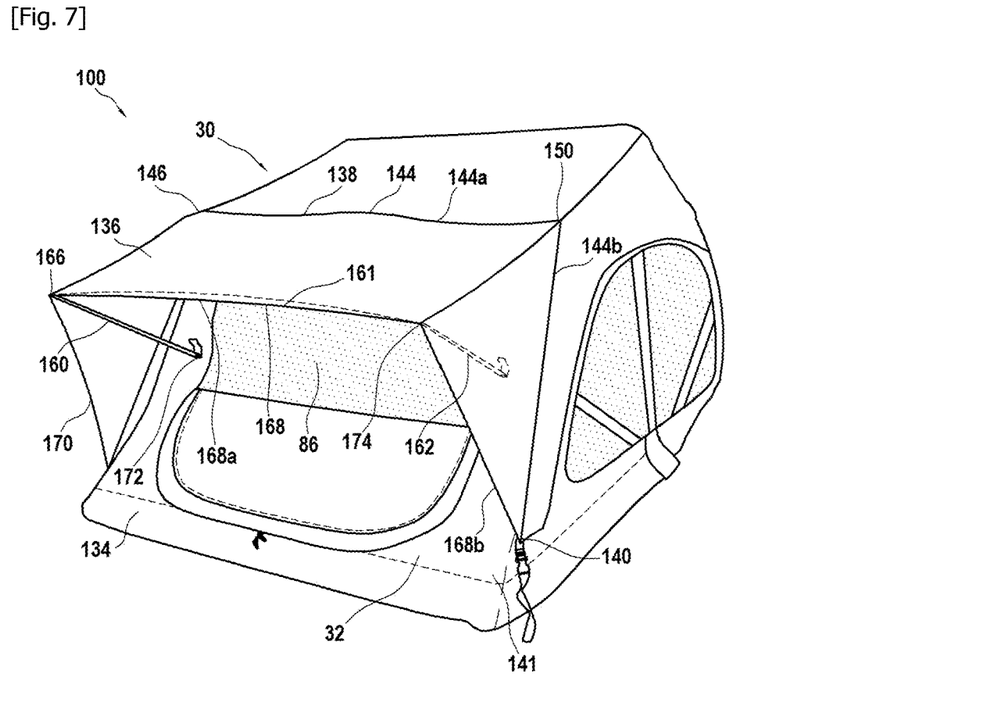
FIG. 7 illustrates the tent of FIG. 6, from another viewing angle.

FIGS. 6 and 7 illustrate a second embodiment of a deployable tent 100 according to the disclosure, in the deployed position. Elements in common with the first embodiment of FIGS. 1 to 5 bear the same reference numbers, increased by the value 100. As can be seen in FIG. 6, the canvas body 32 is here in two parts and includes, in addition to the main part 35, a roof part 39 disposed above the main part and connected to the main part. The roof part 39 forms an over-roof for the tent. The reinforcement 20 of the tent according to this second embodiment is identical to the reinforcement 20 of the tent of the first embodiment.

In this second embodiment, and as illustrated in FIG. 6, the canvas body 32 and more precisely the main part 35 includes a first wall 134 forming a front wall of the tent 100. This first wall 134 extends parallel to the axis of pivot X. The tent canvas 30 further includes a first canopy 136 which is delineated from the canvas body 32 by a connecting line 138 extending between a first upper apex 140 and a second lateral apex 142.

An opening 86 is made in the first wall 134, the first canopy 136 extending above the opening. This opening forms an entrance for the tent.

In this non-limiting example, the first canopy 136 is connected and attached to the roof part 39 of the canvas body 32 over the entire length of the connecting line 138 by means of a continuous seam, from the first lateral apex 140 to the second lateral apex 142. The connecting line 138 delineates the first canopy 136 from the roof part 39 of the canvas body 32. The first canopy also includes a free distal edge 137 extending between the first and second lateral apices.

In this second embodiment, the tent 100 includes only two reinforcements, namely a first reinforcement 160 and a second reinforcement 162, each including a rod. The first and second reinforcements 160,162 form one and the same part and are interconnected by a connecting portion 161. In this non-limiting example, the connecting portion 161 includes a rod connecting the distal ends of the first and second reinforcements. The first and second reinforcements 160,162 along with the connecting portion 161 form a "U"-shaped tensioning element. The connecting portion 161 interacts with the free distal edge 137 of the first canopy 136 between the first distal apex 166 and the second distal apex 174.

As in the first embodiment, the connecting line 138 includes first and second connecting line portions 144,148 while the free distal edge 137 includes first and second edge portions 168,170. The first connecting line portion 144 includes a first proximal vertex 144a extending between the first upper apex 146 and the second upper apex 150, as well as a second proximal vertex 144b extending between the second upper apex 150 and the first lateral apex 140. The first edge portion 168 includes a first distal vertex 168a extending between the first distal apex 166 and the second distal apex 174 of the free distal edge 137, as well as a second distal vertex 168b extending between the second distal apex 174 and the first lateral apex 140.

In a similar way to the first embodiment, when the user brings the frame 20 into the unfolded position, the canvas body 32 is tensioned as well as the first and second connecting line portions 144,148 and the first and second edge portions 168,170 are tensioned and exert a force on the first reinforcement 160. Similarly, the first and second proximal vertices 144a,144b of the first connecting line portion 144 as well as the first and second distal vertices 168a,168b of the first edge portion 168, when tensioned, exert a force on the second reinforcement 162.

The first and second reinforcements 160, 162 then pivot with respect to the first wall 134 and with respect to the main part 35 of the canvas body 32 toward the base plane P, from the folded-down position into the deployed position illustrated in FIGS. 6 and 7. In this deployed position, the first and second reinforcements 160, 162 protrude transversely to the first wall 134 of the tent canvas such that the first canopy 136 is deployed.

In other words, the first reinforcement 160 and therefore the first canopy 136 are automatically brought into the deployed position when the reinforcement is deployed.

Figure 8:
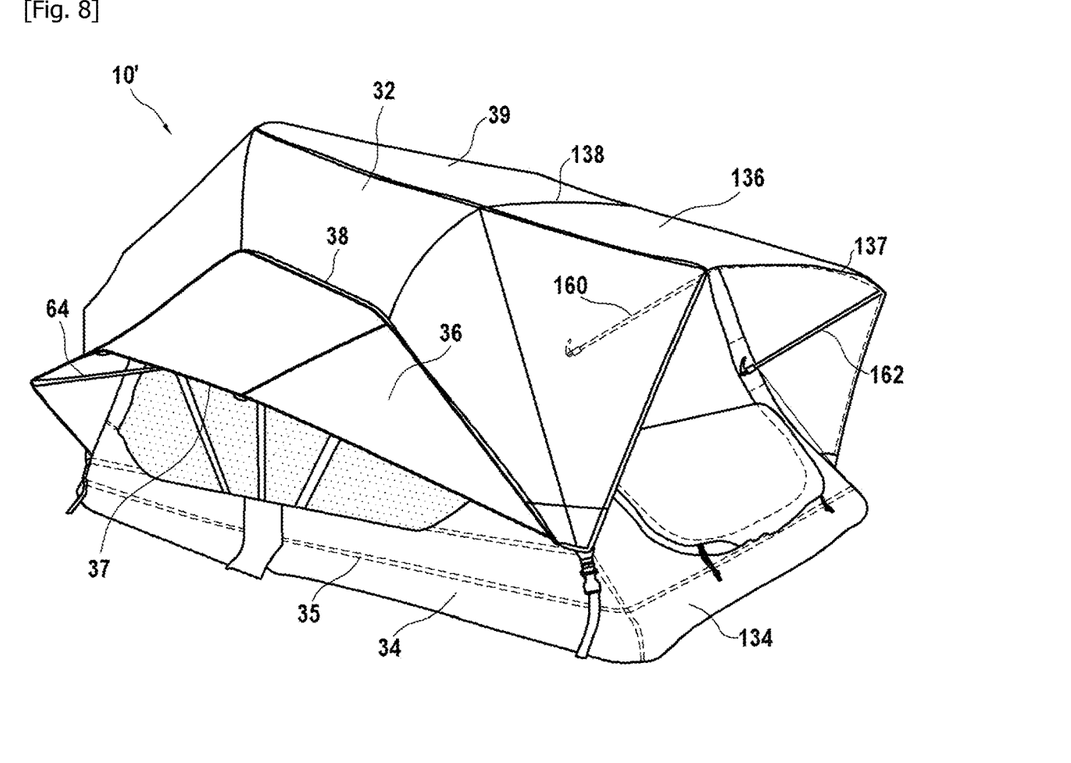
FIG. 8 illustrates a third embodiment of a tent according to the disclosure.

FIG. 8 illustrates a third embodiment of a deployable tent 10' according to the disclosure, including a first canopy 36 similar to the first canopy 36 of the first embodiment and a second canopy 136 similar to the first canopy of the second embodiment. The first 36 and second 136 canopies are deployed when the frame 20 is unfolded, as described previously. To do this, the tent includes first, second and third reinforcements 60,62,64 interacting with the first canopy and which can in particular take a deployed position in which they protrude transversely to the first wall 34 of the tent canvas in such a way as to deploy the first canopy 136 with respect to the canvas body 32. The tent 10' further includes first and second secondary reinforcements 160,162 interacting with the second canopy and mounted pivotably with respect to the canvas body. These secondary reinforcements can take a deployed position in which they protrude transversely to the second wall 134 of the tent canvas such as to deploy the second canopy 136 with respect to the canvas body.

The invention claimed is:

1. A deployable tent comprising:
  a frame comprising a first base part and a second base part mounted pivotably with respect to the first base part, about an axis of pivot, between a folded position in which the second base part rests above the first base part, and an unfolded position in which the first and second base parts extend side-by-side in a base plane, in such a way as to form a base for the tent, the frame further comprising at least a first pole mounted pivotably with respect to at least one of the first and second base parts about a first axis of rotation parallel to said axis of pivot, said first pole being configured to extend transversely to the base plane when the frame is in the unfolded position and to extend between the first base part and the second base part when the frame is in the folded position; and
  a tent canvas interacting with the frame comprising:
  a canvas body, comprising at least a first wall of the tent canvas; and
  at least a first canopy delineated from the canvas body by a connecting line extending between a first lateral apex located on a first side of said first wall and a second lateral apex located on a second side of the first wall, opposite the first side, the connecting line comprising a first connecting line portion extending between a first upper apex of said connecting line and the first lateral apex, and a second connecting line portion extending between said first upper apex and said second lateral apex, said first canopy further comprising a free distal edge distant from the connecting line and extending between said first and second lateral apices, the free distal edge comprising a first edge portion extending between a first distal apex of the free distal edge and the first lateral apex and a second edge portion extending between said first distal apex and the second lateral apex, the tent further comprising at least a first reinforcement extending between the first distal apex and the canvas body, said first reinforcement being furthermore articulated pivotably with respect to the first wall of the tent canvas in at least a first lower part disposed below said first upper apex, such that the first reinforcement extends under said first canopy when the frame is unfolded, said first reinforcement being able to take a folded-down position in which it extends against the canvas body when the frame is placed in the folded position, and a deployed position in which it protrudes transversely to the first wall of the tent canvas, wherein bringing the frame from the folded position to the unfolded position causes the first and second connecting line portions and the first and second edge portions to be tensioned and to exert a force on the first reinforcement thereby pivoting said first reinforcement with respect to the canvas body toward the base plane, from the folded-down position into the deployed position such as to deploy the first canopy with respect to the canvas body, and wherein bringing the frame from the unfolded position to the folded position causes the first reinforcement to pivot from the deployed position to the folded-down position.

2. The deployable tent as claimed in claim 1, wherein the first and second base parts take the form of plates defining a floor for the tent when the frame is in the unfolded position.

3. The deployable tent as claimed in claim 1, wherein the axis of pivot of the second base part with respect to the first base part is colinear with the first axis of rotation of the first pole with respect to at least one of the first and second base parts.

4. The deployable tent as claimed in claim 1, wherein the frame further comprises a second pole mounted pivotably with respect to at least one of the first and second base parts about a second axis of rotation parallel to said axis of pivot, said second pole extending between the first pole and the base plane, when the frame is in the unfolded position.

5. The deployable tent as claimed in claim 1, wherein said first reinforcement comprises at least one rod extending between the first distal apex of the free distal edge of the first canopy and the first lower part, said rod being articulated pivotably with respect to the canvas body.

6. The deployable tent as claimed in claim 1, wherein the first canopy is attached to the canvas body over substantially the whole length of the connecting line, for example by seams.

7. The deployable tent as claimed in claim 1, wherein the first canopy is tensioned between said first upper apex and said first distal apex, when said first reinforcement is brought into the deployed position.

8. The deployable tent as claimed in claim 1, wherein the first connecting line portion comprises a first proximal vertex extending between the first upper apex and a second upper apex, distant from the first upper apex, as well as a second proximal vertex extending between said second upper apex and said first lateral apex, and wherein the first edge portion comprises a first distal vertex extending between said first distal apex and a second distal apex of the free distal edge, distant from the first distal apex, and a second distal vertex extending between said second distal apex and the first lateral apex, the tent further comprising a second reinforcement extending between the second distal apex and the canvas body, the second reinforcement being furthermore articulated pivotably with respect to the first wall of the tent canvas in at least a second lower part disposed below said second upper apex, such that the second reinforcement extends under said first canopy when the frame is unfolded, said second reinforcement being able to take a deployed position and a folded-down position in which it extends against the canvas body, when the frame is placed in the folded position, in which, when the frame is brought into the unfolded position, the first and second proximal vertices of the first connecting line portion and the first and second distal vertices of the first edge portion are tensioned and exert a force on the second reinforcement such as to pivot said second reinforcement with respect to the canvas body toward the base plane from the folded-down position into the deployed position in which it protrudes transversely to the first wall of the tent canvas such as to deploy the first canopy with respect to the canvas body.

9. The deployable tent as claimed in claim 8, wherein said first wall of the tent canvas is a front or back wall extending substantially parallel to said axis of pivot of the second base part with respect to the first base part, and wherein the first and second reinforcements form one and the same part.

10. The deployable tent as claimed in claim 9, wherein the first and second reinforcements are interconnected by a connecting portion, said connecting portion interacting with the free distal edge of the first canopy between the first distal apex and the second distal apex.

11. The deployable tent as claimed in claim 1, wherein the canvas body comprises a main part interacting at least with said first pole in such a way as to form an inner volume of the tent and a roof part, connected to the main part, said first canopy being connected to said roof part.

12. The deployable tent as claimed in claim 1, wherein said first wall of the tent canvas is a lateral wall extending transversely with respect to the axis of pivot of the second base part with respect to the first base part.

13. The deployable tent as claimed in claim 12, wherein the first lateral apex and the second lateral apex extend on either side of the first pole.

14. The deployable tent as claimed in claim 12, wherein the first lateral apex and the second lateral apex are disposed in proximity to the longitudinal ends of the tent.

15. The deployable tent as claimed in claim 1, wherein said first wall of the tent canvas is a front or back wall extending substantially parallel to said axis of pivot of the second base part with respect to the first base part.

16. The deployable tent as claimed in claim 15, wherein an opening is made in said first wall of the tent, said first canopy extending above said opening.

17. A deployable tent comprising: a
frame comprising a first base part and a second base part mounted pivotably with respect to the first base part, about an axis of pivot, between a folded position in which the second base part rests above the first base part, and an unfolded position in which the first and second base parts extend side-by-side in a base plane, in such a way as to form a base for the tent, the frame further comprising at least a first pole mounted pivotably with respect to at least one of the first and second base parts about a first axis of rotation parallel to said axis of pivot, said first pole being configured to extend transversely to the base plane when the frame is in the unfolded position and to extend between the first base part and the second base part when the frame is in the folded position; and a tent canvas interacting with the frame comprising:
a canvas body, comprising at least a first wall of the tent canvas; and
at least a first canopy delineated from the canvas body by a connecting line extending between a first lateral apex located on a first side of said first wall and a second lateral apex located on a second side of the first wall, opposite the first side, the connecting line comprising a first connecting line portion extending between a first upper apex of said connecting line and the first lateral apex, and a second connecting line portion extending between said first upper apex and said second lateral apex, said first canopy further comprising a free distal edge distant from the connecting line and extending between said first and second lateral apices, the free distal edge comprising a first edge portion extending between a first distal apex of the free distal edge and the first lateral apex and a second edge portion extending between said first distal apex and the second lateral apex, the tent further comprising at least a first reinforcement extending between the first distal apex and the canvas body, said first reinforcement being furthermore articulated pivotably with respect to the first wall of the tent canvas in at least a first lower part disposed below said first upper apex, such that the first reinforcement extends under said first canopy when the frame is unfolded, said first reinforcement being able to take a deployed position and a folded-down position in which it extends against the canvas body and along said first pole, when the frame is placed in the folded position, in which, when the frame is brought into the unfolded position, the first and second connecting line portions and the first and second edge portions are tensioned and exert a force on the first reinforcement such as to pivot said first reinforcement with respect to the canvas body toward the base plane, from the folded-down position into the deployed position in which it protrudes transversely to the first wall of the tent canvas such as to deploy the first canopy with respect to the canvas body.

18. A deployable tent comprising: a
frame comprising a first base part and a second base part mounted pivotably with respect to the first base part, about an axis of pivot, between a folded position in which the second base part rests above the first base part, and an unfolded position in which the first and second base parts extend side-by-side in a base plane, in such a way as to form a base for the tent, the frame further comprising at least a first pole mounted pivotably with respect to at least one of the first and second base parts about a first axis of rotation parallel to said axis of pivot, said first pole being configured to extend transversely to the base plane when the frame is in the unfolded position and to extend between the first base part and the second base part when the frame is in the folded position; and a tent canvas interacting with the frame comprising:
a canvas body, comprising at least a first wall of the tent canvas which is a lateral wall extending transversely with respect to the axis of pivot of the second base part with respect to the first base part; and at least a first canopy delineated from the canvas body by a connecting line extending between a first lateral apex located on a first side of said first wall and a second lateral apex located on a second side of the first wall, opposite the first side, the connecting line comprising a first connecting line portion extending between a first upper apex of said connecting line and the first lateral apex, and a second connecting line portion extending between said first upper apex and said second lateral apex, said first canopy further comprising a free distal edge distant from the connecting line and extending between said first and second lateral apices, the free distal edge comprising a first edge portion extending between a first distal apex of the free distal edge and the first lateral apex and a second edge portion extending between said first distal apex and the second lateral apex, the tent further comprising at least a first reinforcement extending between the first distal apex and the canvas body, said first reinforcement being furthermore articulated pivotably with respect to the first wall of the tent canvas in at least a first lower part disposed below said first upper apex, such that the first reinforcement extends under said first canopy when the frame is unfolded, the first reinforcement pivoting with respect to the first wall of the tent canvas in a plane containing the first pole, said first reinforcement being able to take a deployed position and a folded-down position in which it extends against the canvas body, when the frame is placed in the folded position, in which, when the frame is brought into the unfolded position, the first and second connecting line portions and the first and second edge portions are tensioned and exert a force on the first reinforcement such as to pivot said first reinforcement with respect to the canvas body toward the base plane, from the folded-down position into the deployed position in which it protrudes transversely to the first wall of the tent canvas such as to deploy the first canopy with respect to the canvas body.

19. A deployable tent comprising: a
frame comprising a first base part and a second base part mounted pivotably with respect to the first base part, about an axis of pivot, between a folded position in which the second base part rests above the first base part, and an unfolded position in which the first and second base parts extend side-by-side in a base plane, in such a way as to form a base for the tent, the frame further comprising at least a first pole mounted pivotably with respect to at least one of the first and second base parts about a first axis of rotation parallel to said axis of pivot, said first pole being configured to extend transversely to the base plane when the frame is in the unfolded position and to extend between the first base part and the second base part when the frame is in the folded position; and a tent canvas interacting with the frame comprising:
a canvas body, comprising at least a first wall of the tent canvas which is a lateral wall extending transversely with respect to the axis of pivot of the second base part with respect to the first base part; and at least a first canopy delineated from the canvas body by a connecting line extending between a first lateral apex located on a first side of said first wall and a second lateral apex located on a second side of the first wall, opposite the first side, the connecting line comprising a first connecting line portion extending between a first upper apex of said connecting line and the first lateral apex, and a second connecting line portion extending between said first upper apex and said second lateral apex, said first canopy further comprising a free distal edge distant from the connecting line and extending between said first and second lateral apices, the free distal edge comprising a first edge portion extending between a first distal apex of the free distal edge and the first lateral apex and a second edge portion extending between said first distal apex and the second lateral apex, the tent further comprising at least a first reinforcement extending between the first distal apex and the canvas body, said first reinforcement being furthermore articulated pivotably with respect to the first wall of the tent canvas in at least a first lower part disposed below said first upper apex, such that the first reinforcement extends under said first canopy when the frame is unfolded, said first reinforcement being able to take a deployed position and a folded-down position in which it extends against the canvas body, when the frame is placed in the folded position, in which, when the frame is brought into the unfolded position, the first and second connecting line portions and the first and second edge portions are tensioned and exert a force on the first reinforcement such as to pivot said first reinforcement with respect to the canvas body toward the base plane, from the folded-down position into the deployed position in which it protrudes transversely to the first wall of the tent canvas such as to deploy the first canopy with respect to the canvas body, wherein the canvas body further comprises at least a second wall which is transverse to the first wall and extends substantially parallel to said axis of pivot of the second base part with respect to the first base part, the tent canvas further comprising at least a second canopy delineated from the canvas body by a connecting line extending between a first lateral apex located on a first side of said second wall and a second lateral apex located on a second side of the second wall, opposite the first side, the connecting line comprising a first connecting line portion extending between a first upper apex of said connecting line and the first lateral apex, and a second connecting line portion extending between said first upper apex and said second lateral apex, said second canopy further comprising a free distal edge distant from the connecting line and extending between said first and second lateral apices, the free distal edge comprising a first edge portion extending between a first distal apex of the free distal edge and the first lateral apex and a second edge portion extending between said first distal apex and the second lateral apex, the tent further comprising at least a first secondary reinforcement extending between the first distal apex of the second canopy and the canvas body, said first secondary reinforcement being furthermore articulated pivotably with respect to the second wall of the tent canvas in at least a first lower part disposed below said first upper apex, such that the first secondary reinforcement extends under said second canopy, and said first secondary reinforcement being able to take a deployed position and a folded-down position in which it extends against the canvas body, when the frame is placed in the folded position, in which, when the frame is brought into the unfolded position, the first and second connecting line portions and the first and second edge portions of the second canopy are tensioned and exert a force on the first secondary reinforcement such as to make said first secondary reinforcement pivot with respect to the canvas body toward the base plane from the folded-down position into the deployed position in which it protrudes transversely to the second wall of the tent canvas such as to deploy the second canopy with respect to the canvas body.

* * * * *